3,058,881
BACTERIACIDAL COMPOSITION
Herman E. Wilde, 637 St. Marks Ave., Westfield, N.J.
No Drawing. Filed Jan. 29, 1958, Ser. No. 711,786
8 Claims. (Cl. 167—38.6)

The invention relates to a composition of matter containing organic substances. More particularly it pertains to compositions for the treatment of various materials and includes correlated improvements and discoveries whereby desirable characteristics are imparted thereto.

An object of the invention is the provision of a composition of matter having distinctive bacteriacidal, fungicidal and insecticidal propertes.

Another object of the invention is to provide a composition of matter which when applied to various materials renders them markedly resistant to the action of bacteria, fungi and insects.

A further object of the invention is to provide a composition of matter especially adapted for imparting desired bacteriacidal, fungicidal and insecticidal characteristics to textile materials which may be fabricated from natural and from synthetic materials as wool, cotton, silk, rayon, nylon, and Orlon.

An additional object of the invention is to provide a composition of matter that may be readily, efficiently and economically prepared to a desired extent and which may be easily applied to various materials.

A particular object of the invention is to provide a composition of matter containing a quaternary ammonium chloride, e.g. an alkyl dimethyl benzyl ammonium chloride and an organic salt such as pyridyl mercuric chloride.

Other objects of the invention will in part be obvious and will in part appear hereinafter.

The invention accordingly comprises a composition of matter possessing the characteristics, properties, and the relation of constituents which will be exemplified in the composition hereinafter described, and the scope of the invention will be indicated in the claims.

In the practice of the invention a composition is prepared which contains as essential active constituents a quaternary ammonium chloride and a member of the group consisting of bacteriacidal, fungicidal and insecticidal agents. Hereinafter, for brevity, it will be understood that bacteriacidal agent includes fungicidal and insecticidal agents.

The composition also contains a member of the group consisting of pyridyl and phenyl mercuric salts. Furthermore, as bacteriacidal agents, utilization may be made of chloro-2-phenyl-phenol; 2-chloro or 2 - bromo - 4-phenyl-phenol; salicyl anilide; bis(3,5,6 trichloro-2-hydroxy-phenyl) methane, dihydroxy - dichloro-diphenyl methane, zinc dimethyl-dithio-carbamate, quinine salicylate and brominated quinoline.

The pyridyl mercuric salt may be the chloride, the bromide, the iodide, the nitrate or the acetate and the phenyl mercuric salt may be the chloride, the acetate or the nitrate. The quaternary ammonium chloride may be an alkyl dimethyl benzyl ammonium chloride in which the alkyl group has a carbon content $C_8$–$C_{18}$; di isobutyl phenoxy ethoxy ethyl dimethyl benzyl ammoninum chloride; di isobutyl cresoxy ethoxy ethyl dimethyl benzyl ammonium chloride; alkyl tolyl methyl trimethyl ammonium chloride, said alkyl having a carbon content $C_9$–$C_{15}$ and di hydrogenated tallow dimethyl ammonium chloride. The concentration of the quaternary ammonium chloride such as a mixed alkyl dimethyl benzyl ammonium chloride may be from about 5% to about 15% preferably about 7.5% and the concentration of the bacteriacidal agent, for example pyridyl mercuric chloride, may be from about 0.0003% to about 2%, preferably about 0.0625%.

I have discovered that the properties of the resultant compounds are changed yielding a more washfast product.

As an illustrative embodiment of a manner in which the composition may be prepared and its application to materials of commerce, the following description is presented.

A composition is prepared having substantially the composition for 100 pounds of product.

Alkyl ($C_8$–$C_{18}$) dimethyl benzyl
  ammonium chloride _____pounds__ 7.5
Pyridyl mercuric chloride _____ounces__ 1.0
Inert material, e.g. water, q.s.

The above product is mixed with 50 times it weight of water, thus making a solution of 2%.

Mill runs on cotton ticking and rayon tricot were made using the product. These showed excellent results when subjected to the Standard FDA agar plate test method against *Staphylococcus aureus*. Only a very slight decrease in the effectiveness of the treatment was noted after the samples had been given three No. 3A AATCC washings, which are equivalent to fifteen commercial launderings.

The effectiveness of the treatment on 80/80 cotton sheeting against fungal growth was demonstrated by inoculating a test specimen before and after washing with *Cheatomium globosum* and *Aspergillus niger* in accordance with standard testing procedure. No growth developed after 14 days of exposure.

Woolen fabric was treated with a 2% solution of the composition and dried. Treated and untreated samples were exposed to the action of ten black carpet beetle larvae for a period of 28 days. At the end of the test period the untreated sample showed heavy damage and a considerable amount of excrement in the container, whereas the treated samples showed no damage and no excrement. The same fabric after having been washed five times in warm soap and water, still retained its resistance to insect attack. Repeated dry-cleanings were without effect on the treatment.

The composition is prepared so that one hundred pounds contains 15 pounds of a 50% solid content solution of alkyl ($C_8$–$C_{18}$) dimethyl benzyl ammonium chloride and 1 oz. of pyridyl mercuric chloride. The balance is inert, such as solvents and water.

A 10% solution of pyridyl mercuric chloride is prepared in a solution of two parts ammonium acetate, three parts ammonia (28% $NH_4OH$), five parts water. Dilute this solution with five times its volume of water, then add the alkyl dimethyl benzyl ammonium chloride and make up to 100 with water. This composition will be referred to as the concentrate.

When treating materials or fabrics in a mill, the concentrate is diluted with water, 1 part concentrate to 50 parts of water, and applied to the material by the conventional means.

One hundred pounds of the concentrate or 5000 pounds of the application bath will treat 7000 pounds of material.

The pickup of the material is regulated to approximately 60%. The concentration of the application bath is held uniformly constant in volume, and, it will be realized that, the concentration of this bath depends upon mill operating conditions.

The composition, as above stated, has bacteriacidal, fungicidal and insecticidal properties, and it may be applied to various materials, both natural and synthetic: e.g., cotton, wool, silk, hair, linen, fur, feathers, down, leather, rayon, nylon, Orlon, Dacron, wood, wood products and other cellulosic materials.

The composition may also be prepared as follows:

Heat a weighed volume of the alkyl ($C_8$–$C_{18}$) dimethyl benzyl ammonium chloride in a stainless steel steam-jacketed kettle to about 95° C. Add to this heated material the pyridyl mercuric chloride dry powder with agitation till dissolved. The alkyl dimethyl benzyl ammonium chloride will dissolve and hold in solution after cooling 1% of the pyridyl mercuric chloride. The 1% pyridyl mercuric chloride is based on a solution having a 50% solid alkyl dimethyl benzyl ammonium chloride content. This composition is then diluted with additional alkyl dimethyl benzyl ammonium chloride and water to give the proper amount of each constituent, 7.5% of the alkyl dimethyl benzyl ammonium chloride.

The pH of the composition may vary from 3 to 10. The effectiveness of the composition is increased with the increase of the pH, and the preferred pH of the concentrate before dilution is from 8 to 10.

The phenol coefficient of a 5% solution of the concentrate containing 7.5% alkyl dimethyl benzyl ammonium chloride and 0.0625% pyridyl mercuric chloride is $$\frac{1500}{60} \text{ or } 25$$

The composition has an affinity for fibers, and will, when treatment is carried out in a batch process, exhaust to about 85% in 20 minutes at 110° F.

When the treatment is carried out in a continuous operation, the fabric is not in contact with the bath for a period of time sufficient to absorb or reduce, materially, the composition of the bath. On continuous application procedure, if the fabrics are dry when entering the treating bath, the composition of the liquor added to replenish the bath is the same as the original charge.

When, on continuous application, the fabrics are wet as they enter the treating bath, the composition of the make-up liquor that is added during the processing procedure must be adjusted to compensate for the water that is carried into the treating bath, and the difference between the moisture content of the fabric as it enters and after immersion and extraction. The fabric as it goes onto the dryer should always contain more moisture than when it enters the application bath. The operating temperature may vary from about 15° C. (59° F.) to about 100° C. (212° F.), and preferably is from about 43° C. (110° F.) to about 46° C. (115° F.).

Substantivity was shown by test with pH paper QT. The solution containing alkyl dimethyl benzyl ammonium chloride and pyridyl mercuric chloride was made up to 1% by volume. A piece of ticking fabric was worked in the solution for an overall 20 minute period. At the stated time intervals tests were made with the pH test paper showing the decrease in concentration of the composition in the bath. The result was as follows:

| | P.P.M. |
|---|---|
| Original 1% solution | 400 |
| 5 minutes | 300 |
| 10 minutes | 200 |
| 20 minutes | 150 |

With an application of a 2% solution of the concentrate in 98% water and a pickup of 60% by the fabric, each 100 pounds of the fabric will retain 1.2% of the concentrate. This concentrate contains 7.5% of the alkyl dimethyl benzyl ammonium chloride, and 0.0625% pyridyl mercuric chloride. Hence, 100 pounds of fabric contains 1.45 ounces alkyl dimethyl benzyl ammonium chloride and 0.01125 ounce pyridyl mercuric chloride, or 1 part alkyl dimethyl benzyl ammonium chloride in 1,108 parts of fabric and 1 part pyridyl mercuric chloride in 150,000 parts of fabric.

It will be understood that the composition of the product is not limited to the above formulation which contains 7.5% alkyl dimethyl benzyl ammonium chloride and 0.0625% pyridyl mercuric chloride. Thus the alkyl dimethyl benzyl ammonium chloride may vary from about 5.0% to about 15.0%, preferred being about 7.5% and the pyridyl mercuric chloride from about 0.0003% to about 2%, preferred being 0.0625%, or, stated differently, 1 part of alkyl dimethyl benzyl ammonium chloride in 198.0 to 6.6 parts of the concentrate, and 1 part of pyridyl mercuric chloride in 256,000 to 50 parts of the concentrate.

The fabric will, after drying and based on a 2% solution with a 60% pickup, contain, alkyl dimethyl benzyl ammonium chloride 1 part in 16,500 to 550 parts of fabric and pyridyl mercuric chloride 1 part in 21,333,333 to 4,167 parts of fabric.

Toxicity of pyridyl mercuric chloride.

The maximum lethal dose (M.L.D. 50) of pyridyl mercuric chloride on rats is 53.5 mgm./k. The M.L.D. in humans is therefore 53.5 times the body weight of the human in kilos.

Thus, 100 pounds of solution contains 1 ounce pyridyl mercuric chloride, or 1600 ounces contains 1 ounce pyridyl mercuric chloride, or 1600 parts contains 1 part pyridyl mercuric chloride.

When diluted 50 times to make a 2% solution 80,000 parts contain 1 part, and with a 60% pickup 135,000 parts contain 1 part, or 0.00074% of the weight of the fabric.

One pound of fabric will contain 0.0036 mgm. of pyridyl mercuric chloride, and hence 1,500,000 pounds of fabric will contain 53 mgm.

Therefore, the M.L.D. for an infant weighing 10 k., or 25 pounds, would be contained in 15,000,000 pounds of fabric.

The composition has been found to be effective against gram positive and gram negative types of bacteria. It has shown excellent results against *B. coli* and *B. typhosus* as well as *Staphylococcus aureus*. Mention may be made of other bacteria e.g., *Eberthella typhosa, Streptococcus hemolyticus, Streptococcus viridans, Crytococcus hominis, Monilia albicans,* and *Pseudomonas aeruginosa*.

The bacteriacidal property of the composition was demonstrated also with respect to coccidiosis in the following manner:

For this test a house from which the chickens had just been removed was used. At the time of removal they had developed a rather heavy infestation of coccidiosis. The house had not been cleaned, and had housed the chicks for the previous six weeks.

With the aid of Q tip swabs and distilled water, smears were taken from the floor (after removing the chaff from a small area); the roost, and the drinking fountain. These swabs were sealed in individual screw cap tubes, and marked as to the place of origin.

The same spots were then spray moistened with a solution containing alkyl dimethyl benzyl ammonium chloride and pyridyl mercuric chloride in the amounts of about 7.5% of alkyl dimethyl benzyl ammonium chloride and 0.0625% pyridyl mercuric chloride. Without allowing any lapse of time, smears were again taken and placed in sealed tubes.

Cultures were made of each of the swabs, and nutrient agar plates were inoculated with two drops of each of the cultures. After 24 hours of incubation, at a temperature of about 37° C., the three plates inoculated with the culture from the first set of swabs, showed a very heavy growth of mixed bacteria.

The second set of tests, made from the swabs after the treatment, showed only very small isolated colonies.

Compositions were prepared following the same procedure, and on the same basis, as with the alkyl dimethyl benzyl ammonium chloride utilizing pyridyl mercuric chloride and as the quaternary ammonium chloride in one instance alkyl ($C_9$–$C_{15}$) tolyl methyl trimethyl ammonium chloride; in another instance di isobutyl phenoxy ethoxy ethyl dimethyl benzyl ammonium chloride, and in still another instance di hydrogenated tallow dimethyl ammonium chloride. Solutions contained 1 ounce of pyridyl mercuric chloride and 7.5 pounds of the quaternary ammonium chloride per 100 pounds. Fabrics were treated with the solutions having a concentration of 2% with a 60% wet pickup by the fabric being allowed. The fabrics were dried, and when tested evidenced marked bacteriastatic effects.

It will thus be seen that the objects set forth above, among those made apparent from the preceding description, are efficiently attained and, since certain changes may be made in the above composition of matter without departing from the scope of the invention, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A composition of matter comprising in combination (a) about 5 to about 15 parts quaternary ammonium chloride selected from the group consisting of alkyl dimethyl benzyl ammonium chloride, said alkyl portion having a carbon content $C_8$–$C_{18}$, diisobutyl phenoxy ethoxy ethyl dimethyl benzyl ammonium chloride, diisobutyl cresoxy ethoxy ethyl dimethyl benzyl ammonium chloride, alkyl tolyl methyl trimethyl ammonium chloride, said alkyl portion having a carbon content $C_9$–$C_{15}$, and di hydrogenated tallow dimethyl ammonium chloride, and (b) about 0.0003 to about 2 parts pyridyl mercuric salt, said salt portion being selected from the group consisting of chloride, bromide, iodide, nitrate and acetate.

2. A composition of matter comprising in combination about 5 to about 15 parts alkyl dimethyl benzyl ammonium chloride, said alkyl portion having a carbon content $C_8$–$C_{18}$, and about 0.0003 to about 2 parts pyridyl mercuric salt, said salt portion being selected from the group consisting of chloride, bromide, iodide, nitrate and acetate.

3. A composition of matter comprising in combination about 5 to about 15 parts alkyl dimethyl benzyl ammonium chloride, said alkyl portion having a carbon content $C_8$–$C_{18}$, and about 0.0003 to about 2 parts pyridyl mercuric chloride.

4. A composition of matter comprising in combination about 7.5 parts mixed alkyl dimethyl benzyl ammonium chloride, said alkyl portion having a carbon content $C_8$–$C_{18}$, and about 0.625 part pyridyl mercuric chloride.

5. A method for treating an impregnatable material which comprises impregnating in said material a small but effective amount sufficient to impart a wash-fast antibacterial property to said material of a composition comprising in combination about 5 to about 15 parts alkyl dimethyl benzyl ammonium chloride, said alkyl portion having a carbon content $C_8$–$C_{18}$, and about 0.0003 to about 2 parts pyridyl mercuric salt, said salt portion being selected from the group consisting of chloride, bromide, iodide, nitrate and acetate.

6. A method for treating an impregnatable material which comprises impregnating in said material a small but effective amount sufficient to impart a washfast antibacterial property to said material of a composition comprising in combination about 5 to about 15 parts mixed alkyl dimethyl benzyl ammonium chloride, said alkyl portion having a carbon content $C_8$–$C_{18}$, and about 0.0003 to about 2 parts pyridyl mercuric chloride.

7. As an article of manufacture, an impregnatable material containing a small but effective amount sufficient to impart a washfast antibacterial property to said material of a composition comprising in combination about 5 to about 15 parts alkyl dimethyl benzyl ammonium chloride, said alkyl portion having a carbon content $C_8$–$C_{18}$, and about 0.0003 to about 2 parts pyridyl mercuric salt, said salt portion being selected from the group consisting of chloride, bromide, iodide, nitrate and acetate.

8. As an article of manufacture, an impregnatable material containing a small but effective amount sufficient to impart a washfast antibacterial property to said material of a composition comprising in combination about 5 to about 15 parts mixed alkyl dimethyl benzyl ammonium chloride, said alkyl portion having a carbon content $C_8$–$C_{18}$, and about 0.0003 to about 2 parts pyridyl mercuric chloride.

References Cited in the file of this patent

UNITED STATES PATENTS

| | | |
|---|---|---|
| 1,455,749 | Haley | May 15, 1923 |
| 2,216,140 | Shrene et al. | Oct. 1, 1940 |
| 2,366,612 | Hager | Jan. 2, 1945 |
| 2,489,965 | Kolloff | Nov. 29, 1949 |
| 2,524,547 | Sowa | Oct. 3, 1950 |
| 2,544,732 | Shechmeister | Mar. 13, 1951 |
| 2,951,789 | McCants | Sept. 6, 1960 |

FOREIGN PATENTS

| | | |
|---|---|---|
| 1,130,405 | France | Feb. 5, 1957 |
| 1,115,534 | France | Apr. 25, 1956 |

OTHER REFERENCES

Lawrence: Surface-Active Quaternary Ammonium Germicides, pp. 180–191 and 198–202, 1950.

Frear: Chemistry of the Pesticide, pp. 359–62, p. 360 relied on, 3rd edition, January 1955.

Reddish: Antiseptics, Disenfectants, Fungicides and Sterilization, p. 735, 1957.